United States Patent
Chatterji et al.

(12) 
(10) Patent No.: US 6,227,294 B1
(45) Date of Patent: May 8, 2001

(54) METHODS OF CEMENTING SUBTERRANEAN ZONES

(75) Inventors: Jiten Chatterji, Duncan; Roger S. Cromwell, Walters; Bobby J. King, Duncan; Dennis W. Gray, Comanche; Darrell C. Brenneis, Marlow, all of OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 09/569,519

(22) Filed: May 12, 2000

(51) Int. Cl.$^7$ .................................................. E21B 33/138
(52) U.S. Cl. .................. 166/293; 166/309; 106/677; 106/678; 106/725; 106/727; 106/819; 106/820; 106/823
(58) Field of Search .................... 166/292, 293, 166/309; 106/677, 678, 724, 725, 731, 790, 808, 809, 823, 727, 819, 820

(56) References Cited

U.S. PATENT DOCUMENTS

| | | | | |
|---|---|---|---|---|
| 3,662,830 | * | 5/1972 | Martin | 166/293 |
| 4,047,567 | * | 9/1977 | Childs et al. | 166/293 |
| 4,125,160 | * | 11/1978 | Crinkelmeyer et al. | 166/293 |
| 4,871,395 | * | 10/1989 | Sugama | 106/678 |
| 5,133,409 | * | 7/1992 | Bour et al. | 166/293 |
| 5,184,680 | * | 2/1993 | Totten et al. | 166/293 |
| 5,213,161 | | 5/1993 | King et al. | 166/293 |
| 5,220,960 | | 6/1993 | Totten et al. | 166/293 |
| 5,281,270 | | 1/1994 | Totten et al. | 106/687 |
| 5,298,069 | | 3/1994 | King et al. | 106/686 |
| 5,447,197 | * | 9/1995 | Rae et al. | 166/293 |
| 5,588,489 | * | 12/1996 | Chatterji et al. | 166/293 |
| 5,688,844 | | 11/1997 | Chatterji et al. | 524/8 |
| 5,795,924 | | 8/1998 | Chatterji et al. | 523/130 |
| 5,806,594 | | 9/1998 | Stiles et al. | 166/293 |
| 5,820,670 | | 10/1998 | Chatterji et al. | 106/727 |
| 5,900,053 | | 5/1999 | Brothers et al. | 106/678 |
| 6,019,835 | | 2/2000 | Chatterji et al. | 106/725 |
| 6,063,738 | * | 5/2000 | Chatterji et al. | 166/293 X |

* cited by examiner

Primary Examiner—George Suchfield
(74) Attorney, Agent, or Firm—Craig W. Roddy; C. Clark Dougherty, Jr.

(57) ABSTRACT

Improved methods of cementing in a subterranean zone penetrated by a well bore are provided. The methods are basically comprised of the steps of preparing a foamed cement composition comprised of hydraulic cement, a non-dispersing set retarder, sufficient water to form a slurry, sufficient gas to foam the slurry and a foaming and foam stabilizing surfactant mixture present in an amount sufficient to facilitate the formation of the foam and stabilize the foamed cement composition.

21 Claims, No Drawings

METHODS OF CEMENTING SUBTERRANEAN ZONES

BACKGROUND OF THE INVENTION

1. Field of the Invention

The present invention relates to improved methods of cementing in subterranean zones with set retarded foamed cement compositions.

2. Description of the Prior Art

Foamed hydraulic cement compositions are often utilized in cementing subterranean zones penetrated by well bores. For example, foamed cement compositions are used in primary well cementing operations whereby strings of pipe such as casing and liners are cemented in well bores. In performing primary cementing, a cement composition is pumped into the annular space between the walls of a well bore and the exterior surfaces of a pipe string disposed therein. The cement composition is permitted to set in the annular space thereby forming an annular sheath of hardened substantially impermeable cement therein. The cement sheath physically supports and positions the pipe string in the well bore and bonds the exterior surfaces of the pipe string to the walls of the well bore whereby the undesirable migration of fluids between zones or formations penetrated by the well bore is prevented.

The cement compositions utilized for cementing in subterranean zones or formations penetrated by well bores must often be lightweight to prevent excessive hydrostatic pressure from unintentionally fracturing the zones or formations. In addition to being lightweight, a foamed cement composition contains compressed gas which improves the ability of the cement composition to maintain pressure and prevent the flow of formation fluid into and through the cement composition during the transition time, i.e., the time during which the cement composition changes from a true fluid to a hard set mass. Foamed cement compositions are also advantageous because they have low fluid loss properties.

When cement compositions are utilized for cementing in deep hot subterranean zones, a set retarder must be included in the cement composition to increase the pumping time of the composition and prevent premature thickening or setting before placement in the zones to be cemented. Examples of set retarders which have heretofore been utilized in non-foamed cement compositions include, but are not limited to, lignosulfonates, sulfomethylated lignosulfonates, hydroxycarboxy acids, mixtures of sulfomethylated lignosulfonates and hydroxycarboxy acids, acrylic acid/2-acrylamido-2-methyl propane sulfonic acid copolymers and the like. While the foregoing set retarders function well in non-foamed cement compositions, they do not function well in foamed cement compositions because they have dispersing properties. That is, when used in a foamed cement composition, a set retarder having dispersing properties causes the cement slurry to be thin which in turn causes the foam to be unstable and either break or significantly decrease the viscosity of the foamed cement slurry which in turn prevents the desired foamed cement composition low density from being achieved. While carboxymethylhydroxyethylcellulose (CMHEC) has heretofore been used in foamed cement compositions as a set retarder, the high concentrations of CMHEC required for high temperatures causes the foamed compositions to have undesirable high surface viscosities.

Thus, there are needs for improved methods and set retarded foamed cement compositions for cementing subterranean zones penetrated by well bores.

SUMMARY OF THE INVENTION

The present invention provides improved methods and set retarded foamed cement compositions for cementing in subterranean zones penetrated by well bores which meet the needs described above and overcome the deficiencies of the prior art. The improved methods of this invention are basically comprised of the following steps. A foamed cement composition is prepared comprised of hydraulic cement, a non-dispersing set retarder comprised of a mixture of a lignosulfonate, sugar acids and a sulfonated lignin, sufficient water to form a slurry, sufficient gas to foam the slurry and a foaming and foam stabilizing surfactant mixture. The foamed cement composition is then placed into a subterranean zone, and the foamed cement composition is allowed to set into a solid mass therein.

It is, therefore, a general object of the present invention to provide improved methods of cementing in subterranean zones penetrated by well bores.

A further object of the present invention is to provide improved methods of cementing in subterranean zones penetrated by well bores with a foamed cement slurry containing a non-dispersing set retarder.

Other and further objects, features and advantages of the present invention will be readily apparent to those skilled in the art upon a reading of the description of preferred embodiments which follows.

DESCRIPTION OF PREFERRED EMBODIMENTS

The improved methods and foamed cement compositions of the present invention are particularly suitable for performing a variety of completion and remedial procedures in subterranean zones or formations penetrated by well bores. The foamed cement compositions have improved properties in that they include a non-dispersing set retarder which does not cause the foamed cement compositions to break or decrease in viscosity whereby the density of the foamed cement compositions increases. Since it is often very important that the density of a foamed cement composition be as low as possible, an increase in density can cause adverse cementing results, e.g., fracturing of the formation or zone being cemented.

The foamed cement compositions useful in accordance with this invention are basically comprised of a hydraulic cement, a non-dispersing set retarder comprised of a mixture of a lignosulfonate, one or more sugar acids and a sulfonated lignin, sufficient water to form a slurry, sufficient gas to foam the slurry and a foaming and foam stabilizing surfactant mixture present in an amount sufficient to facilitate the formation of the foam and stabilize the foamed cement composition.

U.S. patent application Ser. No. 09/569,422, filed May 12, 2000 entitled Set Retarders For Foamed Cements filed of even date herewith which describes and claims similar non-dispersing set retarders and foamed cement compositions is incorporated herein in its entirety by reference.

A variety of hydraulic cements can be utilized in accordance with the present invention including those comprised of calcium, aluminum, silicon, oxygen and/or sulfur which set and harden by reaction with water. Such hydraulic cements include Portland cements, pozzolana cements, gypsum cements, high alumina content cements, silica cements and high alkalinity cements. Portland cements or their equivalents are generally preferred for use in accordance with the present invention when performing cementing operations in subterranean zones penetrated by well bores. Portland cements of the types defined and described in *API Specification For Materials And Testing For Well Cements*, API Specification 10, $5^{th}$ Edition, dated Jul. 1, 1990 of the American Petroleum Institute are particularly suitable. Preferred API Portland cements include classes A, B, C, G and H, with API classes G and H being more preferred, and class G being the most preferred.

The non-dispersing set retarder utilized in accordance with this invention is a mixture of a lignosulfonate, one or more sugar acids and a sulfonated lignin. The lignosulfonate is a metallic sulfonate salt made from the lignin of sulfite pulp-mill liquors. The specific lignosulfonate which is preferred for use in accordance with this invention is a hardwood lignosulfonate having a sulfur content of about 6% by weight and an average molecular weight of about 9,700 daltons. The one or more sugar acids in the mixture are preferably derived from xylose. The sulfonated lignin in the mixture is preferably a sulfonated kraft lignin, i.e., a lignin produced in the kraft process. The sulfonated kraft lignin preferably has an organic sulfur content of about 3.8% by weight and an average molecular weight of about 60,000 daltons. The non-dispersing set retarder is preferably comprised of a mixture of about 59 parts by weight lignosulfonate, about 11 parts by weight sugar acid and about 30 parts by weight sulfonated lignin.

As will be understood by those skilled in the art, the amount of the non-dispersing set retarder included in the foamed cement compositions of this invention can vary depending upon the temperature and the particular pumping time required. Generally, the non-dispersing set retarder is present in a foamed cement composition of this invention in an amount in the range of from about 0.05% to about 2.75% by weight of hydraulic cement in the composition.

The water utilized to form the foamed cement compositions of this invention can be fresh water or salt water. The term "salt water" is used herein to mean unsaturated salt solutions and saturated salt solutions including brines and seawater. The water is included in the foamed cement compositions in an amount sufficient to slurry the hydraulic cement. Generally, the water is present in the foamed cement compositions in an amount in the range of from about 30% to about 60% by weight of hydraulic cement therein.

The gas utilized for foaming the cement slurry can be air or nitrogen, with nitrogen being preferred. The gas is present in an amount sufficient to foam the slurry, generally in an amount in the range of from about 5% to about 60% by volume of the slurry.

A variety of foaming and foam stabilizing surfactants can be utilized in accordance with the present invention. A preferred mixture of such surfactants is described in U.S. Pat. No. 5,897,699 issued to Chatterji et al. on Apr. 27, 1999 which is incorporated herein by reference. The patent discloses an aqueous solution of a mixture of an alpha-olefinic sulfonate and a cocoylamidopropyl betaine.

A particularly preferred foaming and foam stabilizing surfactant mixture for use in accordance with the present invention is comprised of an ethoxylated alcohol ether sulfate of the formula $H(CH_2)_a(OC_2H_4)_bOSO_3NH_4^+$ wherein a is an integer in the range of from about 6 to about 10 and b is an integer in the range of from about 3 to about 10, an alkyl or alkene amidopropylbetaine having the formula $R-CONHCH_2CH_2CH_2N^+(CH_3)_2CH_2CO_2^-$ wherein R is a radical selected from the group of decyl, cocoyl, lauryl, cetyl and oleyl and an alkyl or alkene amidopropyldimethylamineoxide having the formula $R-CONHCH_2CH_2CH_2N^+(CH_3)_2O^-$ wherein R is a radical selected from the group of decyl, cocoyl, lauryl, cetyl and oleyl.

The ethoxylated alcohol ether sulfate is generally present in the above described mixture in an amount in the range of from about 60 to 64 parts by weight. The alkyl or alkene amidopropylbetaine is generally present in the mixture in an amount in the range of from about 30 to about 33 parts by weight and the alkyl or alkene amidopropyldimethylamineoxide is generally present in the additive in an amount in the range of from about 3 to about 10 parts by weight. In order to make the surfactant mixture more easily combinable with the cement slurry, water can be combined with the mixture in an amount sufficient to dissolve the surfactants.

The most preferred foaming and foam stabilizing surfactant mixture of the type described above for use in accordance with this invention is comprised of an ethoxylated alcohol ether sulfate wherein a in the formula set forth above is an integer in the range of from 6 to 10 and the ethoxylated alcohol ether sulfate is present in the surfactant mixture in an amount of about 63.3 parts by weight; the alkyl or alkene amidopropyl-betaine is cocoylamidopropylbetaine and is present in the mixture in an amount of about 31.7 parts by weight and the alkyl or alkene amidopropyldimethylamineoxide is cocoylamidopropyldimethylamineoxide and is present in an amount of about 5 parts by weight.

The foaming and foam stabilizing surfactant mixture is generally included in the foamed cement composition of this invention in an amount in the range of from about 1% to about 5% by volume of water in the cement slurry, preferably in an amount of from about 1% to about 2.5%.

A particularly preferred foamed cement composition for use in accordance with this invention is comprised of Portland cement, a non-dispersing set retarder comprised of a mixture of about 59 parts by weight hardwood lignosulfonate, about 11 parts by weight xylose sugar acid and about 30 parts by weight sulfonated kraft lignin, sufficient water to form a slurry, sufficient nitrogen to foam the slurry and a foaming and foam stabilizing surfactant mixture present in an amount sufficient to facilitate the formation of the foam and stabilize the foamed cement composition.

The non-dispersing set retarder is preferably included in the above described foamed cement composition in an amount in the range of from about 0.1% to about 2.5% by weight of hydraulic cement therein. The water used is preferably included in the composition in an amount in the range of from about 45% to about 55% by weight of hydraulic cement therein, and the nitrogen is preferably present in the composition in an amount in the range of from about 10% to about 20% by volume of the composition. The foaming and foam stabilizing surfactant mixture is preferably comprised of an ethoxylated alcohol ether sulfate present in an amount of about 63.3 parts by weight of the mixture, cocoylamidopropylbetaine present in an amount of about 31.7 parts by weight of the mixture and cocoylamidopropyldimethylamineoxide present in an amount of about 5 parts by weight of the mixture. The foaming and foam stabilizing surfactant mixture is preferably present in the foamed cement composition in an amount in the range of from about 1% to about 2.5% by volume of water therein.

A preferred method of the present invention for cementing in a subterranean zone penetrated by a well bore is comprised of: (a) preparing a foamed cement composition comprised of Portland cement, a non-dispersing set retarder comprised of a mixture of 59 parts by weight hardwood lignosulfonate, 11 parts by weight xylose sugar acid and 30 parts by weight sulfonated kraft lignin present in an amount in the range of from about 0. 1% to about 2.5% by weight of hydraulic cement in the composition, sufficient water to foam a slurry, sufficient nitrogen to foam the slurry and a foaming and foam stabilizing surfactant mixture comprised of an ethoxylated alcohol ether sulfate present in an amount of about 63.3 parts by weight of the mixture, cocoylamidopropylbetaine present in an amount of about 31.7 parts by weight of the mixture and cocoylamidopropyldimethylamineoxide present in an amount of about 5 parts by weight of the mixture, the foaming and foam stabilizing surfactant mixture being present in the composition in an amount in the range of from about 1% to about 2.5% by volume of water therein; (b) placing the foamed cement composition into the subterranean zone; and (c) allowing the foamed cement composition to set into a solid mass therein.

In order to further illustrate the methods and foamed cement compositions of this invention, the following examples are given.

EXAMPLE 1

The Apparatus Utilized

The preparation of a foamed cement slurry at atmospheric pressure in the laboratory requires a 2-step mixing procedure. The cement slurry without the foaming and foam stabilizing surfactant mixture is first mixed in a standard Waring blender. A specific weight of the cement slurry along with the foaming and foam stabilizing surfactant mixture is then placed into a one-liter multi-bladed sealable mixing container that has a known volume. The weight of the cement slurry placed into the sealable mixing container is the weight that will result in the final foamed cement slurry density when the cement slurry is foamed sufficiently to completely fill the sealable mixing container. The cement slurry is then subjected to the maximum shear energy (rpm) that can be developed by the mixer until the foamed cement slurry produced completely fills the mixing container. For the cement slurry to be considered for a foamed cement application, the cement slurry must foam enough to completely fill the mixing container in 15 seconds or less. When this condition is met, the foamed cement slurry can then be cured and tested for compressive strength and stability indications at atmospheric pressure and temperatures less than approximately 180° F.

The preparation of a foamed cement slurry for curing at temperatures above approximately 180° F. requires the use of special equipment. That is, an instrument known as a Multiple Analysis Cement Slurry Analyzer (MACS Analyzer) must be used. The MACS Analyzer has a sealable chamber of a known volume wherein the slurry is sheared and mixed with nitrogen at high energy. In addition, the sealable chamber can be pressurized with nitrogen and heated. The cement slurry without the foaming and foam stabilizing surfactant mixture is prepared in a standard 2-liter Waring blender having a single mixing blade. A weighed amount of the slurry is placed in the chamber of the MACS Analyzer that will result in the final foamed slurry density when the slurry is foamed sufficiently to completely fill the chamber. The chamber is then sealed and the paddle inside the MACS Analyzer chamber is rotated at approximately 1,000 rpm for 5 minutes with 1,000 psi nitrogen pressure applied to the cement slurry which causes the cement slurry to be foamed. The resulting foamed slurry is subjected to a temperature schedule to simulate well conditions while the nitrogen pressure is maintained on the foamed slurry. After reaching a temperature equal to the bottom hole circulating temperature (BHCT), stirring is continued for 1 hour. The slurry is then transferred through a manifold system to curing cells that have been preheated and charged with nitrogen at the same pressure to which the slurry is subjected in the mixing chamber. After the foamed cement slurry is transferred to the curing cells, the cells are heated to the curing temperature which is normally the bottom hole static temperature (BHST). Upon curing for a selected period of time, the nitrogen pressure is slowly released from the curing cells and the set foamed cement is removed from the cells and tested for stability and/or compressive strength. The stability of the cured foamed cement slurry specimens was determined by observing the density variation of the specimens from the tops to the bottoms of the specimens.

Test Procedure and Results

A mixture of Portland Class H cement and finely ground crystalline silica in an amount of 35% by weight of the cement was mixed with water to form a cement slurry containing water in an amount of 54.23% by weight of the Portland cement in the slurry. A surfactant mixture comprised of ethoxylated alcohol ether sulfate, cocoylamidopropylbetaine and cocoylamidopropylamineoxide was combined with the cement slurry in an amount of 1% by volume of the water in the slurry. The slurry was divided into test samples and various amounts of the non-dispersing set retarder of this invention were added to the test samples. The test samples were then foamed to densities of 15.9 pounds per gallon and tested for thickening times in accordance with the API Specification 10 mentioned above at various temperatures. The results of these tests are given in Table I below.

TABLE I

Foamed Cement Composition Thickening Times

| Test Sample No. | Temperature ° F. | Amount of Non-Dispersing Retarding Agent[1] Used, % by Weight of Cement | Thickening Time, hr:min |
| --- | --- | --- | --- |
| 1 | 150 | 0.1 | 3:12 |
| 2 | 200 | 0.2 | 3:31 |
| 3 | 200 | 0.3 | 5:48 |
| 4 | 250 | 1.0 | 2:53 |
| 5 | 250 | 1.125 | 3:34 |
| 6 | 250 | 1.2 | 4:07 |
| 7 | 250 | 1.25 | 7:40 |
| 8 | 275 | 1.5 | 2:00 |
| 9 | 275 | 1.75 | 2:32 |
| 10 | 275 | 2.0 | 2:49 |
| 11 | 275 | 2.25 | 4:00 |
| 12 | 275 | 2.5 | 6:48 |

[1]Mixture of 59 parts by weight of hardwood lignosulfonate, 11 parts by weight xylose sugar acid and 30 parts by weight sulfonated kraft lignin.

From Table I, it can be seen that the non-dispersing set retarder of this invention functioned very well.

EXAMPLE 2

A number of non-foamed cement slurry test samples produced in Example 1 were cured at various temperatures and tested for 12 hour and 24 hour compressive strengths as well as for crushed strength using an Ultrasonic Cement Analyzer. The results of these tests are set forth in Table II.

TABLE II

Compressive Strength Tests

| Test Sample No. | Temperture ° F. | Compressive Strength After 12 Hrs, psi | Compressive Strength After 24 Hrs, psi | Crushed Strength psi |
|---|---|---|---|---|
| 1 | 225 | 1209 | 1727 | 3070 |
| 3 | 243 | 1500 | 2074 | 3680 |
| 5 | 318 | 2800 | 3546 | 7250 |
| 12 | 330 | 2777 | 2990 | 7630 |

From Table II, it can be seen that the non-foamed cement slurries tested had good compressive strengths.

EXAMPLE 3

To a first test sample of the non-foamed cement/crystalline silica slurry described in Example 1, the non-dispersing set retarder of this invention was added in an amount of 1% weight of Portland cement in the slurry. To a second test sample of the non-foamed cement/crystalline silica slurry of Example 1, a dispersing sulfomethylated lignin set retarder was added in an amount of 0.3% by weight of Portland cement in the slurry. The two test samples were foamed at ambient conditions to densities of 11.2 pounds per gallon and allowed to set at 140° F. for 24 hours. The densities of the set foamed cement samples were then determined. The results of these tests are shown in Table III below.

TABLE III

Foamed Cement Slurry Properties With Dispersing And Non-Dispersing Set Retarders

| Test Cement Composition Sample | Cement Slurry Density, lb/gal | Foamed Cement Slurry Density, lb/gal | Density of Set Foamed Cement Slurry, lb/gal |
|---|---|---|---|
| First | 15.9 | 11.2 | 11.2 |
| Second | 15.9 | 11.2 | 15.0 |

From Table III, it can be seen that the cement composition containing the non-dispersing set retarder of this invention maintain its low density during setting while the set foamed cement composition containing the dispersing set retarder did not.

EXAMPLE 4

A cement slurry was prepared comprised of Portland Class H cement, finely ground crystalline silica in an amount of 30% by weight of the Portland cement, amorphous silica in an amount of 15% by weight of the Portland cement, hydroxypropylguar gum with a M.S. of 0.6 in an amount of 0.4% by weight of the Portland cement, water in an amount of 53% by weight of the Portland cement, and a foaming and foam stabilizing surfactant mixture comprised of ethoxylated alcohol ether sulfate, cocoylamidopropylbetaine and cocoylamidopropylamineoxide in an amount of 2% by volume of water in the slurry.

To a first test sample of the cement slurry, the non-dispersing set retarder of the present invention was added in an amount of 1.2% by weight of the Portland cement. To a second test portion of the cement slurry, a dispersing set retarder comprised of an aqueous solution of tartaric acid was added in an amount of 3.2% by weight of the Portland cement along with an aqueous solution of a dispersing set retarder comprised of a copolymer of acrylic acid and 2-acrylamido-2-methylpropane sulfonic acid in an amount of 1% by weight of the Portland cement. The first and second test cement slurry samples were foamed under temperatures and pressures according to the following schedule: the foamed cement slurry samples were heated from 80° F. to 250° F. in 1 hour, held at 250° F. for 1 hour, transferred and cured at 318° F. for 24 hours, all at 1,000 psi. After setting, the set foamed cement compositions were tested for top, middle and bottom densities. The results of these tests are set forth in Table IV below.

TABLE IV

Foamed Cement Slurry Properties With Dispersing And Non-Dispersing Properties

| Test Cement Composition Sample | Cement Slurry Density, lb/gal | Foamed Cement Slurry Density, lb/gal | Density of Set Foamed Cement Slurry, lb/gal | | |
|---|---|---|---|---|---|
| | | | Top | Middle | Bottom |
| First | 16.14 | 12.1 | 11.98 | 12.45 | 12.79 |
| Second | 15.99 | 12.8 | 11.18 | 12.66 | 13.08 |

From Table IV, it can be seen that the first sample of the foamed cement composition containing the non-dispersing set retarder of this invention was considerably more stable than the second sample of the foamed cement composition containing prior art dispersing set retarders.

Thus, the present invention is well adapted to carry out the objects and attain the ends and advantages mentioned as well as those inherent therein. While numerous changes may be made by those skilled in the art, such changes are encompassed within the spirit of this invention as defined by the appended claims.

What is claimed is:

1. An improved method of cementing in a subterranean zone penetrated by a well bore comprising the steps of:
   (a) preparing a foamed cement composition comprised of hydraulic cement, a non-dispersing set retarder comprised of a mixture of lignosulfonate, sugar acid and sulfonated lignin, sufficient water to form a slurry, sufficient gas to foam said slurry and a foaming and foam stabilizing surfactant mixture present in an amount sufficient to facilitate the formation of said foam and stabilize said foamed cement composition;
   (b) placing said foamed cement composition into said subterranean zone; and
   (c) allowing said foamed cement composition to set into a solid mass therein.

2. The method of claim 1 wherein said lignosulfonate in said non-dispersing set retarder is hardwood lignosulfonate having a sulfur content of about 6% by weight and an average molecular weight of about 9,700 daltons.

3. The method of claim 1 wherein said sugar acid in said non-dispersing set retarder is xylose sugar acid.

4. The method of claim 1 wherein said sulfonated lignin in said non-dispersing set retarder is sulfonated kraft lignin having an organic sulfur content of about 3.8% by weight and an average molecular weight of about 60,000 daltons.

5. The method of claim 1 wherein said non-dispersing set retarder is comprised of a mixture of 59 parts by weight lignosulfonate, 11 parts by weight sugar acid and 30 parts by weight sulfonated lignin.

6. The method of claim 1 wherein said non-dispersing set retarder is present in said composition in an amount in the range of from about 0.05% to about 2.75% by weight of hydraulic cement in said composition.

7. The method of claim 1 wherein said hydraulic cement in said composition is selected from the group of Portland cements, slag cements, pozzolana cements, gypsum cements, high alumina content cements and high alkalinity cements.

8. The method of claim 1 wherein said hydraulic cement in said composition is Portland cement.

9. The method of claim 1 wherein said water in said composition is selected from the group consisting of fresh water, unsaturated salt solutions and saturated salt solutions.

10. The method of claim 1 wherein said water is present in said composition in an amount in the range of from about 30% to about 60% by weight of hydraulic cement in said composition.

11. The method of claim 1 wherein said gas in said composition is selected from the group consisting of air and nitrogen.

12. The method of claim 1 wherein said gas is present in said composition in an amount in the range of from about 5% to about 60% by volume of said composition.

13. The method of claim 1 wherein said foaming and foam stabilizing surfactant mixture in said composition is comprised of an ethoxylated alcohol ether sulfate present in an amount of about 63.3 parts by weight, cocoylamidopropylbetaine present in an amount of about 31.7 parts by weight and cocoylamidopropyl-dimethylamineoxide present in an amount of about 5 parts by weight.

14. The method of claim 1 wherein said foaming and foam stabilizing surfactant mixture is present in said composition in an amount in the range of from about 1% to about 5% by volume of water therein.

15. An improved method of cementing in a subterranean zone penetrated by a well bore comprising the steps of:

(a) preparing a foamed cement composition comprised of Portland cement, a non-dispersing set retarder comprised of a mixture of about 59 parts by weight hardwood lignosulfonate, about 11 parts by weight xylose sugar acid and about 30 parts by weight sulfonated kraft lignin, sufficient water to foam a slurry, sufficient nitrogen gas to foam said slurry and a foaming and foam stabilizing surfactant mixture present in an amount sufficient to facilitate the formation of said foam and stabilize said foamed cement composition;

(b) placing said foamed cement composition into said subterranean zone; and (c) allowing said foamed cement composition to set into a solid mass therein.

16. The method of claim 15 wherein said non-dispersing set retarder is present in said composition in an amount in the range of from about 0.05% to about 2.75% by weight of hydraulic cement in said composition.

17. The method of claim 15 wherein said water in said composition is selected from the group consisting of fresh water, unsaturated salt solutions and saturated salt solutions.

18. The method of claim 15 wherein said water is present in said composition in an amount in the range of from about 30% to about 60% by weight of hydraulic cement in said composition.

19. The method of claim 15 wherein said nitrogen is present in said composition in an amount in the range of from about 5% to about 60% by volume of said composition.

20. The method of claim 15 wherein said foaming and foam stabilizing surfactant mixture in said composition is comprised of an ethoxylated alcohol ether sulfate present in an amount of about 63.3 parts by weight, cocoylamidopropylbetaine present in an amount of about 31.7 parts by weight and cocoylamidopropyl-dimethylamineoxide present in an amount of about 5 parts by weight.

21. The method of claim 15 wherein said foaming and foam stabilizing surfactant mixture is present in said composition in an amount in the range of from about 1% to about 2.5% by volume of water therein.

* * * * *